(12) United States Patent
Hon et al.

(10) Patent No.: US 7,574,348 B2
(45) Date of Patent: Aug. 11, 2009

(54) PROCESSING COLLOCATION MISTAKES IN DOCUMENTS

(75) Inventors: Hsiao-Wuen Hon, Bellevue, WA (US); Jianfeng Gao, Beijing (CN); Ming Zhou, Beijing (CN)

(73) Assignee: Microsoft Corporation, Redmond, WA (US)

( * ) Notice: Subject to any disclaimer, the term of this patent is extended or adjusted under 35 U.S.C. 154(b) by 455 days.

(21) Appl. No.: 11/177,136

(22) Filed: Jul. 8, 2005

(65) Prior Publication Data

US 2007/0010992 A1 Jan. 11, 2007

(51) Int. Cl.
G06F 17/27 (2006.01)
(52) U.S. Cl. .................. 704/9; 704/4; 707/3; 707/6
(58) Field of Classification Search .............. 704/9, 704/4
See application file for complete search history.

(56) References Cited

U.S. PATENT DOCUMENTS

| 4,868,750 | A | * | 9/1989 | Kucera et al. ............... 704/8 |
| 4,942,526 | A | * | 7/1990 | Okajima et al. .............. 704/10 |
| 5,251,129 | A | * | 10/1993 | Jacobs et al. ................. 704/9 |
| 5,383,120 | A | * | 1/1995 | Zernik ....................... 704/10 |
| 5,541,836 | A | * | 7/1996 | Church et al. ................ 704/7 |
| 5,617,488 | A | * | 4/1997 | Hong et al. ................. 382/229 |
| 5,680,511 | A | * | 10/1997 | Baker et al. ................ 704/257 |
| 5,721,938 | A | | 2/1998 | Stuckey ....................... 704/4 |
| 5,907,839 | A | * | 5/1999 | Roth ........................... 707/5 |
| 6,064,951 | A | | 5/2000 | Park et al. ..................... 704/8 |
| 6,173,252 | B1 | * | 1/2001 | Qiu et al. ..................... 704/9 |
| 6,173,298 | B1 | * | 1/2001 | Smadja ...................... 715/209 |
| 6,199,034 | B1 | * | 3/2001 | Wical .......................... 704/9 |
| 6,216,123 | B1 | * | 4/2001 | Robertson et al. ............. 707/3 |
| 6,397,174 | B1 | | 5/2002 | Poznanski et al. ............. 704/9 |
| 6,847,972 | B1 | | 1/2005 | Vernau et al. ............... 707/101 |
| 7,249,012 | B2 | * | 7/2007 | Moore .......................... 704/4 |
| 7,269,546 | B2 | * | 9/2007 | Stensmo ....................... 704/9 |
| 7,421,155 | B2 | * | 9/2008 | King et al. ................. 382/312 |
| 2002/0007266 | A1 | | 1/2002 | Poznanski |
| 2002/0152219 | A1 | | 10/2002 | Singh |
| 2003/0036900 | A1 | * | 2/2003 | Weise ........................... 704/9 |
| 2003/0088410 | A1 | * | 5/2003 | Geidl et al. ................ 704/235 |
| 2003/0149692 | A1 | | 8/2003 | Mitchell ....................... 704/9 |

(Continued)

FOREIGN PATENT DOCUMENTS

EP 0 269 233 10/1987

OTHER PUBLICATIONS

E. Brill. Transformation-based error-driven learning and natural language processing: a case study in part of speech tagging. Dec. 1995. Computational Linguistics.*

(Continued)

*Primary Examiner*—Talivaldis I Smits
*Assistant Examiner*—Greg A Borsetti
(74) *Attorney, Agent, or Firm*—Joseph R. Kelly; Westman, Champlin & Kelly, P.A.

(57) ABSTRACT

A sentence is accessed and at least one query is generated based on the sentence. At least one query can be compared to text within a collection of documents, for example using a web search engine. Collocation errors in the sentence can be detected and/or corrected based on the comparison of the at least one query and the text within the collection of documents.

13 Claims, 5 Drawing Sheets

U.S. PATENT DOCUMENTS

| | | | | |
|---|---|---|---|---|
| 2003/0154071 | A1 | 8/2003 | Shreve | 704/9 |
| 2003/0233226 | A1 | 12/2003 | Kim et al. | |
| 2004/0006466 | A1 | 1/2004 | Zhou et al. | |
| 2004/0059564 | A1* | 3/2004 | Zhou | 704/4 |
| 2004/0122656 | A1* | 6/2004 | Abir | 704/4 |
| 2005/0091211 | A1* | 4/2005 | Vernau et al. | 707/6 |
| 2005/0125215 | A1 | 6/2005 | Wu | 704/10 |
| 2006/0282255 | A1* | 12/2006 | Lu et al. | 704/2 |
| 2007/0016397 | A1* | 1/2007 | Lu et al. | 704/2 |

OTHER PUBLICATIONS

Yarowsky, David. One sense per Collocation. In Proceedings of ARPA Human Language Technology Workshop. Dec. 1993. pp. 266-271, Princeton, NJ.*

Lin, D. 1998. Extracting Collocations from Text Corpora. Workshop on Computational Terminology. pp. 57-63. Montreal, Canada.*

Chang and Chang. 2004. Computer Assisted Language Learning based on Corpora and Natural Language Processing: The Experience of Project CANDLE. p. 15-23.*

Bolshakov, I.A., S.N. Galicia-Haro. Web-Assisted Detection and Correction of Joint and Disjoint Malapropos Word Combinations. In: A. Montoyo, R. Muñoz, E. Metais (Eds.) Natural Language Processing and Information Systems (NLDB'2005). Lecture Notes in Computer Science, N 3513, Springer, 2005, p. 126-137.*

Yuqi Zhang Qiang Zhou, Oct. 2003, Chinese partial parser for automatic extraction of verb grammatical collocations, Natural Language Processing and Knowledge Engineering, 2003. Proceedings. 2003 International Conference.*

Yang, S.: Machine Learning for Collocation Identification. International Conference on Natural Language Processing and Knowledge Engineering, Chengqing Zong (eds), Beijing. China, IEEE Press, Oct. 26-29. ISBN: 0-7803-7902-0. 315-321 (2003).*

Ruifeng Xu, Qin Lu, and Yin Li. 2003. An automatic Chinese Collocation Extraction Algorithm Based On Lexical Statistics. In Proceedings of the NLPKE Workshop. Beijing, China.*

Frank Smadja. 1993. Retrieving collocations from text: Xtract. Computational Linguistics, 19(1): 143-178.*

Q. Lu, Y. Li, and R. E Xu, "Iniproving Xtract for Chinese Collocation Extraction", submitted for publication.*

Shei, C. C. and Pain, H.: An ESL writer's collocation aid. Computer Assisted Language Learning, 13 (2) (2000) 167 182.*

Kenji Kita and Hiroaki Ogata. 1997. Collocations in language learning: Corpus-based automatic compilation of collocations and bilingual collocation concordancer. Computer Assisted Language Learning: An International Journal, 10(3):229-238.*

Bolshakov, I. A.: Getting One's First Million . . . Collocations. In: A. Gelbukh (Ed.) Computational Linguistics and Intelligent Text Processing. Lecture Notes in Computer Science, N 2945, Springer-Verlag, 2004 (this volume), pp. 226-239. [Bolshakov & Gelbukh 2002] Bolshakov, I.A., A. Gelbukh. Heuristics-based.*

R. Bunescu. 2003. Associative anaphora resolution: A Web-based approach. In R. Dale, K. van Deemter, and R. Mitkov, editors, Proc. of the EACL Workshop on the Computational Treatment of Anaphora.*

Mihalcea, R., 2002. The semantic wildcard. In Proceedings of the LREC Workshop on "Creating and Using Semantics for Information Retrieval and Filtering State of the Art and Future Research". Canary Islands, Spain.*

Biemann, C., Quastho, U., Wol, C.: Linguistic corpus search. In: Proceedings of 4th International Conference on Language Resources and Evaluation. (2004).*

Y. J. Lv et al. "Collocation Translation Acquisition- Using Monolingual Corpora," Proc. ACL2004, pp. 167-174, Barcelona, Spain, 2004.*

Bolshakov, I. A., A. Gelbukh. On Detection of Malapropisms by Multistage Collocation Testing. In: A. Düsterhöft, B. Talheim (Eds.) Proc. 8th Intern. Conf. on Applications of Natural Language to Information Systems NLDB-2003, Burg, Germany. GI-Edition, Lecture Notes in Informatics V. P-29, Bonn, 2003, p. 28-41.*

Chapelle, C. A., Jamieson, J., & Hegelheimer, V. (2003). Validation of a webbased ESL test. Language Testing, 20(4), 409-439.*

K. Tanaka Ishii, H. Nakagawa. A Multilingual Usage Consultation Tool Based on Internet Searching—More than a Search Engine, Less than QA-. WWW Conference, pp. 363-371, 2005.*

Bergh, G. 2005. Min(d)ing English language data on the Web: What can Google tell us? ICAME Journal, 29, p. 25-46. <http://gandalf.aksis.uib.no/icame/ij29/ij29-pages25-46.pdf> accessed Feb. 2006.*

Bolshakov, I.A. An Experiment in Detection and Correction of Malapropisms through the Web. In: A. Gelbukh (Ed.). Computational Linguistics and Intelligent Text Processing. (CICLing-2005). Lecture Notes in Computer Science, N 3406, Springer, 2005, p. 803-825.*

Danny Minn, Hiroshi Sano, Marie Ino and Takahiro Nakamura. "Using the BNC to create and develop educational materials and a website for learners of English" ICAME Journal 29. Apr. 2005.*

"Announcing a Greek Word Collocation Tool," Sep. 9, 1999, http://www.perseus.tufts.edu/PR/colloc.ann.html, accessed Oct. 5, 2007.

Copy of Search Report and Written Opinion from Application No. PCT/US06/26012, filed Jun. 30, 2006; mailed Apr. 30, 2007.

Suzanne Ross, Microsoft Research News & Highlights, Choose Your Words Carefully, 2 pages, May 2005.

Patric Hadenius, Less Lost in Translation, TechnologyReview.com, p. 1 of 1, Jul. 26, 2004.

E. Brill, J. Lin, M. Banko, S. Dumais and A. Ng. 2002. Data-intensive question answering. In: *TREC-2002* (Feb. 2002).

"About Xlex/www" http://uni-muenster.de/Portal/Xlexwww/about.html (available at least as of Apr. 4, 2004).

"Tapor: Prototype of Text Analysis Tools," http://taporware.mcmaster.ca (available at least as of Mar. 12, 2005).

\* cited by examiner

PROCESSING COLLOCATION MISTAKES IN DOCUMENTS

BACKGROUND

The discussion below is merely provided for general background information and is not intended to be used as an aid in determining the scope of the claimed subject matter.

With an ever increasing global economy, and with the rapid development of the Internet, people all over the world are becoming increasingly familiar with writing in a language which is not their native language. Unfortunately, for some societies that possess significantly different cultures and writing styles, the ability to write in some non-native languages is an ever-present barrier. When writing in a non-native language (for example English), language usage mistakes are frequently made by non-native speakers (for example, people who speak Chinese, Japanese, Korean or other non-English languages). These kind of mistakes can include both grammatical mistakes and improper usage of collocations such as verb-object, adjective-noun, adverb-verb, etc.

Many people have the ability to write in a non-native language using proper grammar, but they still may struggle with mistakes in collocations between two words. Still others struggle with both grammar and other mistakes such as collocations between two words. While spell checking and grammar checking programs are useful in correcting grammatical mistakes, detection and/or correction of mistakes in collocations between two words can be difficult, particularly since these mistakes can be otherwise grammatically correct. Therefore, grammar checkers typically provide very little assistance, if any, in detecting mistakes relating to the collocation between words. English is used as an example of the non-native language in the following discussion, but these problems persist across other language boundaries.

For example, consider the following sentences that contain collocation mistakes which cause the sentences to not be native-like English, even if otherwise grammatically correct.
1. Open the light.
2. Everybody hates the crowded traffic on weekends.
3. This is a check of US$ 500.
4. I congratulate you for your success.

The native-like English versions of these sentences should be like:
1. Turn on the light.
2. Everybody hates the heavy traffic on weekends.
3. This is a check for US$ 500.
4. I congratulate you on your success.

As an example of the barriers faced by non-native English speaking people, consider the plight of Chinese users. By culture, background and thinking habits, Chinese people often produce English sentences which may be grammatical, but not natural. For example, Chinese people tend to directly translate subjects in Chinese into subjects in English, and do the same with objects and verbs. When writing in English, Chinese people often experience difficulty in deciding the collocations between verbs and prepositions, adjectives and nouns, verbs and nouns, etc. Moreover, in specific domains like the business domain, special writing skills and styles are needed.

Common dictionaries are mainly used by non-native speakers for the purpose of reading (a kind of decoding process), but these dictionaries do not provide enough support for writing (a kind of encoding process). They only provide the explanation of a single word, and they typically do not provide sufficient information to explain relevant phrases and collocations. Moreover, there is no easy way to get this kind of information from dictionaries, even if some of the information is provided in the dictionaries. On the other hand, current widely used grammar checking tools have some limited ability in detecting apt-to-make grammatical mistakes, but are not able to detect the collocation mistakes.

SUMMARY

This Summary is provided to introduce some concepts in a simplified form that are further described below in the Detailed Description. This Summary is not intended to identify key features or essential features of the claimed subject matter, nor is it intended to be used as an aid in determining the scope of the claimed subject matter.

A sentence is accessed and at least one query is generated based on the sentence. At least one query can be compared to text within a collection of documents, for example using a web search engine. Collocation errors in the sentence can be detected and/or corrected based on the comparison of the at least one query and the text within the collection of documents.

DETAILED DESCRIPTION

Figure 1:
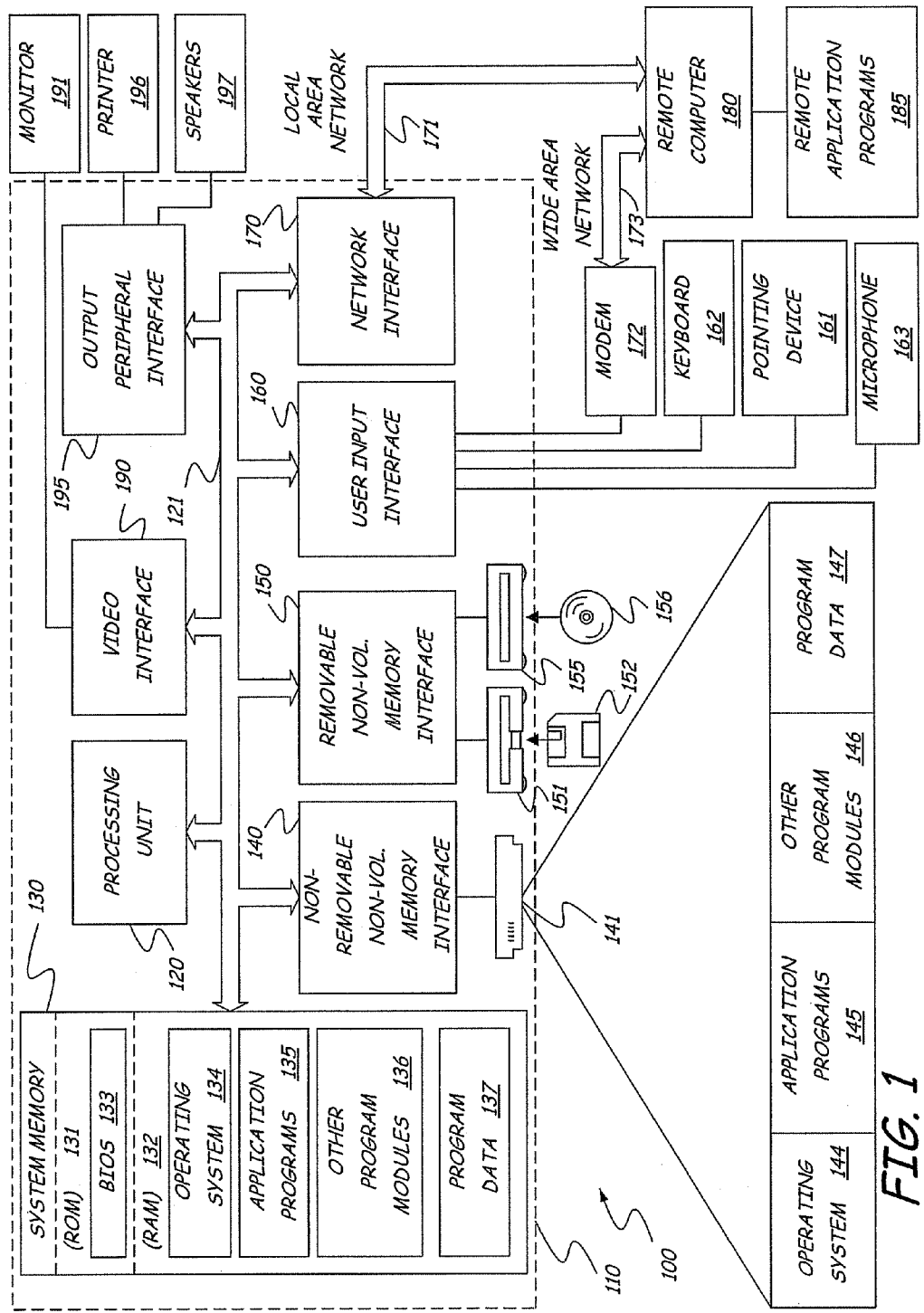
FIG. 1 is a block diagram of a general computing environment.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
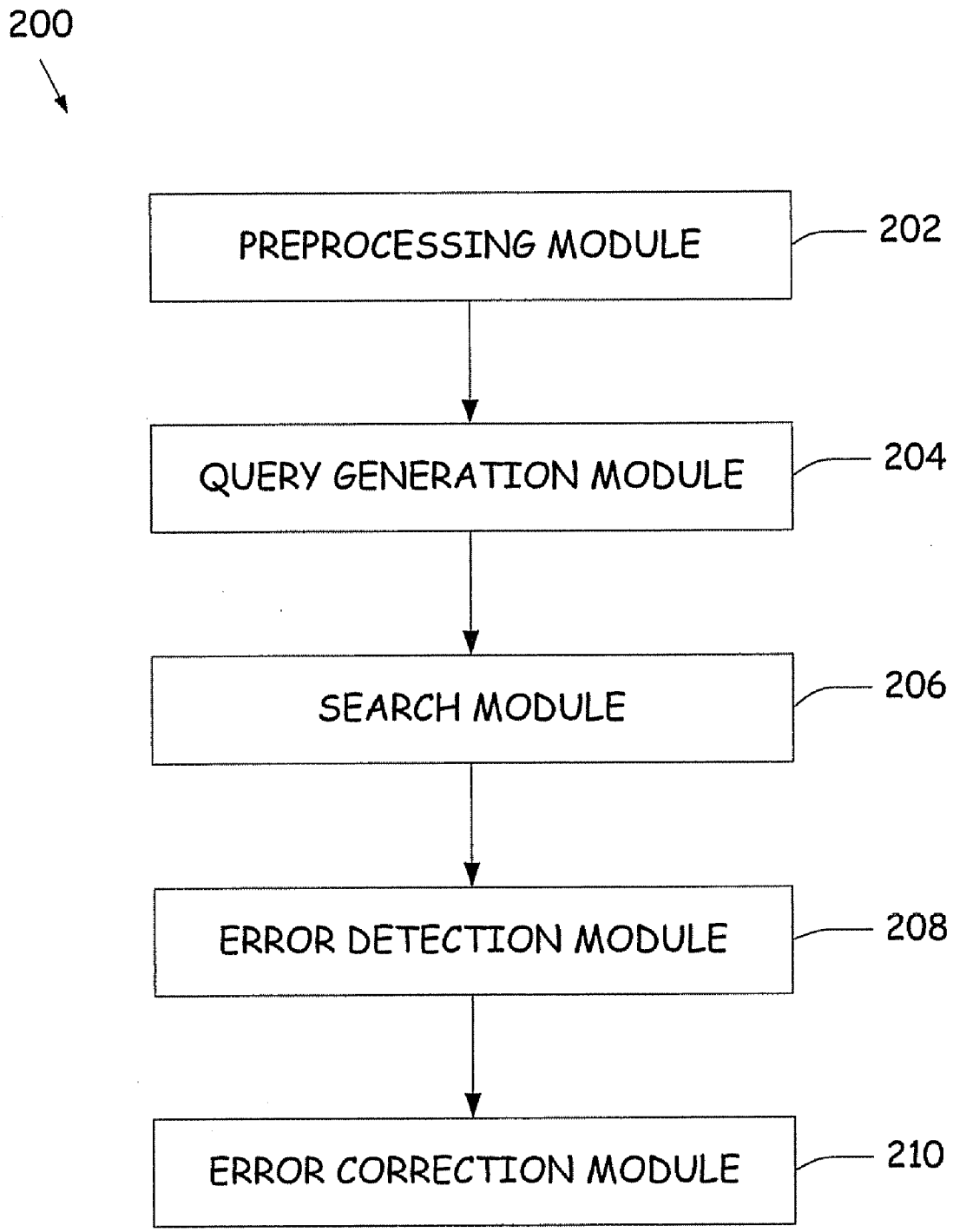
FIG. 2 is a flow diagram of a system for detecting and correcting collocation errors.

FIG. 2 is a flow diagram of a system 200 for detecting and correcting collocation errors within text. There are many types of collocation errors. In one aspect of system 200, four types of collocation errors are detected. The collocation error types include:

1. verb-noun (VN, e.g. *learn/acquire knowledge),
2. preposition-noun (PN, e.g. *on/in the morning),
3. adjective-noun (AN, e.g. *social/socialist country), and
4. verb-adverb (VA, e.g. situations change *largely/greatly).

Preprocessing module 202 processes text to provide part of speech tagging and chunk parsing of the text. Many different types of parsers can be used to process the text. Below is an example sentence:

I have recognized this person for years.

Preprocessing module 202 tags this sentence and chunks the sentence as follows:

[NP I/PRP][VP have/VBP recognized/VBN][NP this/DT person/NN][PP for/IN][NP years. </s>/NNS]

Using the processed text, query generation module 204 constructs queries. In one example, four sets of queries are generated for each type of collocation error type identified above. For example, the collocation error types can be verb-noun, preposition-noun, adjective-noun and verb-adverb. The queries generated can include the full text of the sentence as well as a reduced portion of the sentence where auxiliaries are removed. Example reduced queries for the sentence above can include, "have recognized this person", "have recognized", "this person" and "recognized person".

The queries are submitted to a search module 206. In one embodiment, the search module can be a web based search engine such as MSN Search (search.msn.com), Google (www.google.com) and/or Yahoo! (www.yahoo.com). It is known to those skilled in the art that web based search engines search a collection of documents to obtain results therefrom. Portions of text similar to the queries are retrieved from the search module based on results from the query submission. Since the web includes a vast amount of text, it can be an inexpensive resource to detect collocation errors. Error detection module 208 compares the queries generated by query generation module 204 to results obtained by search module 206. Error correction module 210 provides candidate corrections for the errors identified by error detection module 208.

Figure 3:
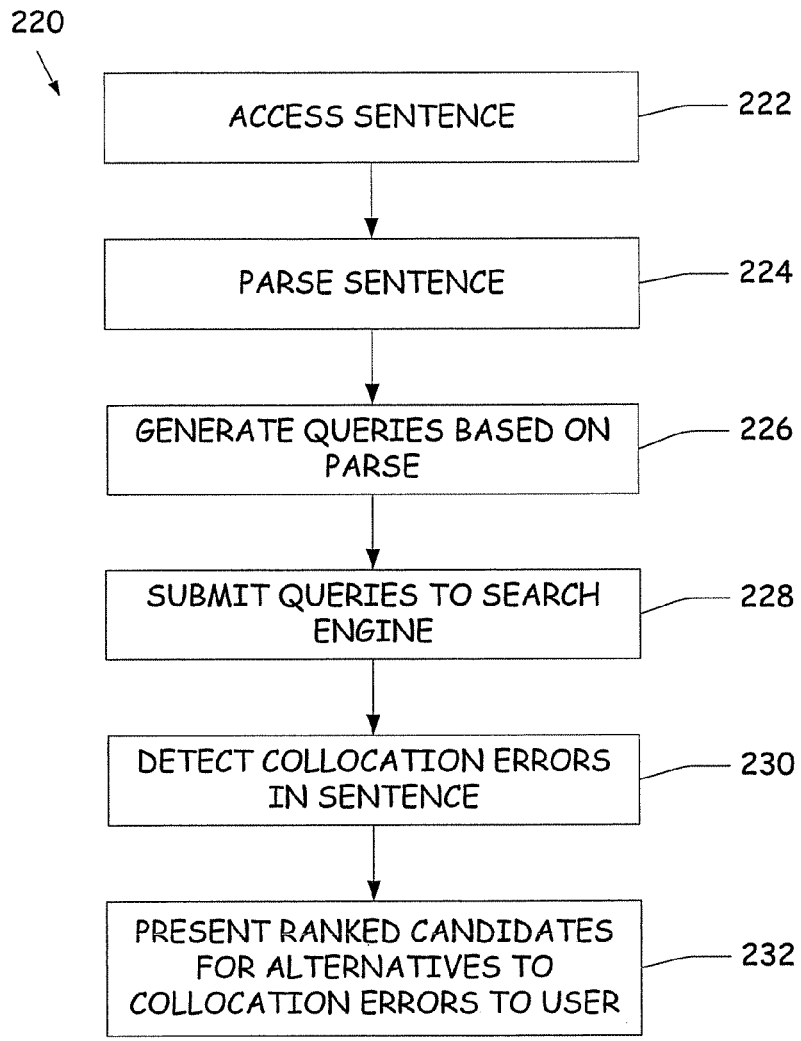
FIG. 3 is a flow diagram of a method for detecting and correcting collocation errors.

FIG. 3 is a flow diagram of a method 220 that can be implemented in system 200 illustrated in FIG. 2. At step 222, a sentence is accessed. The sentence may include text that has been input into a word processor, for example Microsoft Word® available from Microsoft Corporation of Redmond, Wash. At step 224, the sentence is parsed into chunks and part of speech tags within the sentence are identified. Then, queries are generated based on the parse at step 226. At step 228, the queries are submitted to a search engine, for example MSN Search, Google and/or Yahoo!. Text similar to the queries is retrieved from the search engine. Collocation errors in the sentence are detected at step 230 by comparing the queries and results from the search engine. After detecting errors, ranked candidates for alternatives to the collocation errors are presented to the user at step 232.

Figure 4:
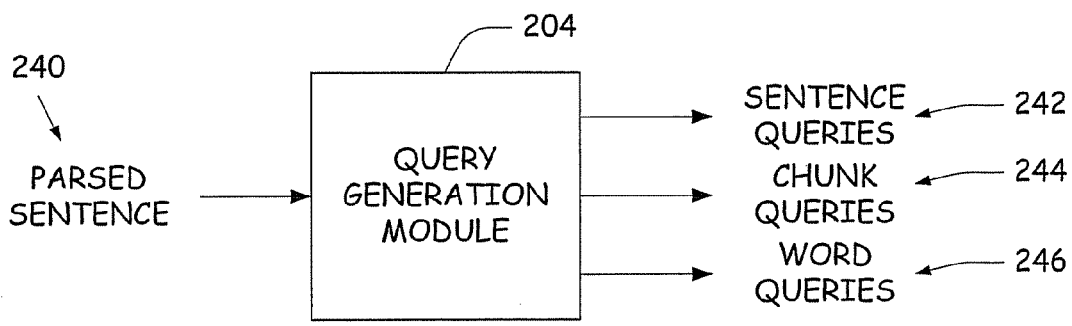
FIG. 4 is a block diagram of a query generation module.

FIG. 4 is a block diagram of query generation module 204 of FIG. 2. Query generation module 204 accepts a parsed sentence 240, for example a parsed sentence received from preprocessing module 202. Based on parsed sentence 240, query generation module 204 generates sentence queries 242, chunk queries 244 and word queries 246. Given the types of potential collocation errors identified above, a checking word (i.e. a word that potentially causes a collocation error) is detected as follows: verb in type VN, preposition in type PN, adjective in type AN, and adverb in type VA. Depending on the type, query generation module 204 generates a different set of queries as follows:

1. Sentence queries 242: original sentence and reduced sentence (by removing auxiliaries pre-defined for each type), called S-Query,
2. Chunk queries 242: corresponding chunk pairs in the sentence, called C-Query, and
3. Word queries 246: corresponding headword pairs in the sentence, called W-Query.

Example queries for the sentence "I have recognized this person for years" for type VN detection are presented below, where ~ means that two adjacent words can be adjacent or one-word away from each other.

S-Query: ["I have recognized this person for years"]
S-Query: ["have recognized this person"]
C-Query: ["have recognized"~"this person"]
W-Query: ["recognized"~"person"]

Example rules for generating queries of each type are as follows.

VN: S-Queries, one C-Query V~N, and one W-Query $V_h$~$N_h$ ($N_h$ denotes a headword of a corresponding noun chunk).
PN: one C-Query of PN, which contains the preposition;
AN: one C-Query of AN, which contains the AN pair; and
VA: C-Queries that contain VA pairs and W-Queries that contains VA headwords.

Figure 5:
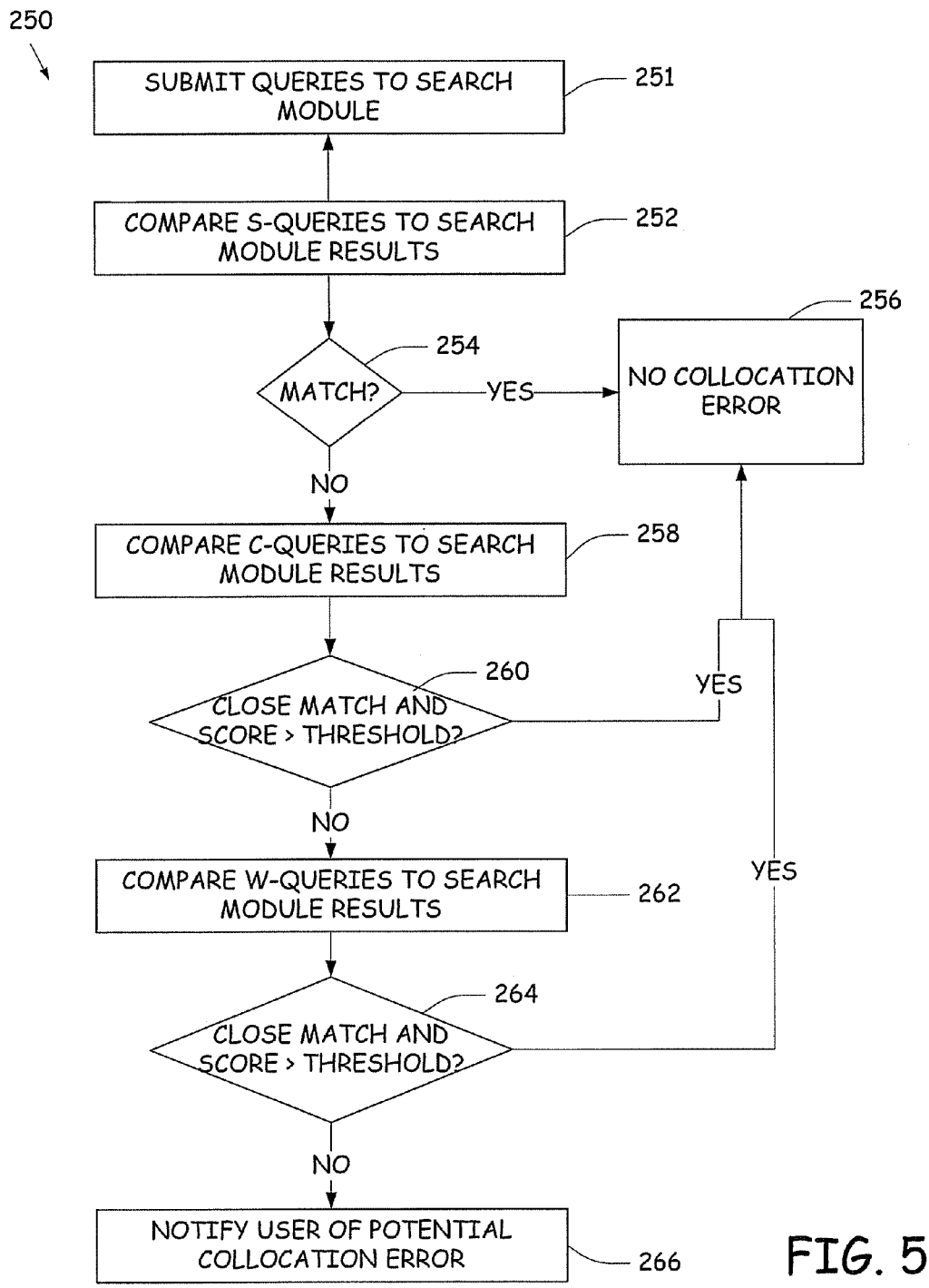
FIG. 5 is a flow diagram of a method for detecting collocation errors.

FIG. 5 is a flow diagram of a method 250 of detecting errors in a sentence. Queries generated by query generation module 204 are submitted to the search module 206 at step 251 to retrieve search results. Search results obtained by the search module 206 are compared to the queries. In one example, the results include a summary of text for a document retrieved using a web search engine. At step 252, S-queries 242 from query generation module 204 are compared to results from the search module. Then, at step 254, a determination is made as to whether one or more of the S-queries 242 match the search module results. If one or more of the S-queries match the search module results, it is determined that no collocation error exists at step 256.

However, if a match does not exist, method 250 proceeds to step 258, wherein C-queries 244 are compared to the search module results. At step 260, it is determined whether one or more of the C-queries closely match the search module results and if a score for the comparison is greater than a threshold. In one example, the score is computed by dividing a number of times the chunk of the C-query appears in the search results by the number of times words in the C-query co-occur in the search results. If the score is greater than the threshold, it is determined that no collocation error exists at step 256.

If the score is less than the threshold, method 250 proceeds to step 262, wherein W-Queries are compared to the search engine data. Step 264 determines whether there is a close match between the W-queries and the search engine data and whether a score for the comparison is greater than a threshold. If the score is greater than the threshold, it is determined that no collocation error exists at step 256. The score for the comparison can be similar to the C-Query comparison score. Thus, the W-Query comparison score can be calculated by dividing the number of times the W-Query occurs in the search results by the total number of times the pair of words in the W-Query co-occurs. If the score is less than the threshold, method 250 proceeds to step 266, wherein the user is notified of a potential collocation error.

Figure 6:
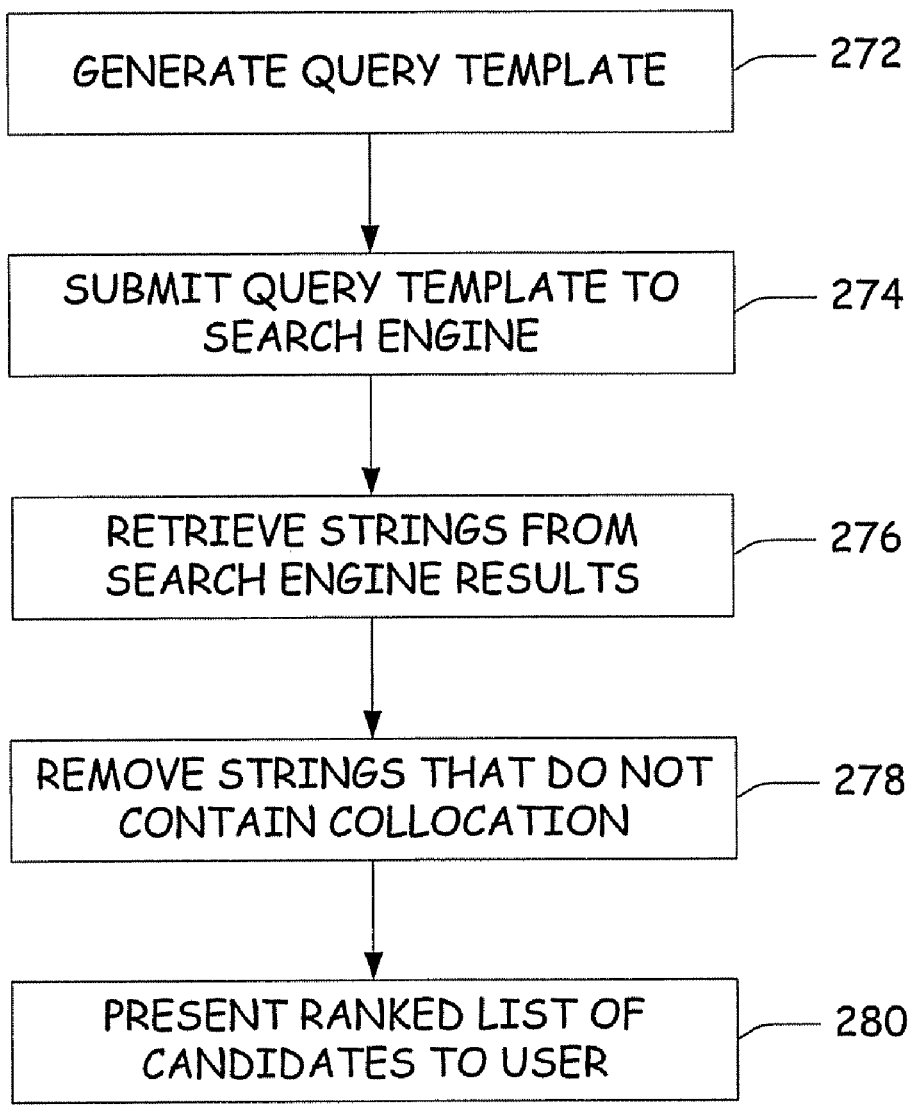
FIG. 6 is a flow diagram of a method for presenting candidate collocation corrections.

FIG. 6 is a flow diagram of a method 270 for presenting potential corrected collocations to a user. At step 272 a query template is generated. The query templates are generated based on a word that has been identified as an error (i.e. the checking word above includes a collocation error as determined by method 250 in FIG. 5). Query templates are derived from the input sentence after the checking word causing the collocation error has been replaced with a "+". In the sentence above, "recognized" has been identified as the checking word and thus query templates are developed based on the word. For example, the query templates of the sentence "I have recognized this person for years", for VN detection, are as follows, where + denotes any word.

S-QT: ["I have + this person for years"]
S-QT: ["I have + this person"]
S-QT: ["have + this person for years"]
S-QT: ["I have + this person"]
C-QT: ["+ this person for years"]
C-QT: ["+ this person"]

Example rules for generating query templates can be as follows.

VN: S-QT, C-QT (where the verb has been replaced with +).
PN: S-QT, C-QT (where the preposition has been replaced with +);
AN: S-QT, C-QT (where the adjective has been replaced with +); and
VA: S-QT, C-QT (where the adverb has been replaced with +).

At step 274, the query template is submitted to a search module, herein a search engine. At step 276, strings from the search engine results are retrieved. The strings can include summaries of text that have words of surrounding context. Strings that match the query templates, where the position of + can be any one word, are identified as strings candidates. Candidates that do not contain the collocation (which is formed by a word replacing + and another word in the string according to the collocation type) are removed at step 278. Remaining candidates are ranked according to a score based on a corresponding weight of query template that matched the string candidate. For example, the weight of the query template can be based on the number of words in the query template. The score for each candidate is calculated by taking a sum for weights across all summaries containing the candidates. The score for query templates ($QT_s$) that retrieve the candidate can be expressed by:

$$\text{Score(candidate)} = \Sigma_{QT_s} \text{Weight}(QT)$$

A ranked list of candidates is then presented to a user at step 280. For example, a pop-up menu can be used to present the ranked list. A user can choose one of the selections from the list to correct the collocation error.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computer-implemented method of correcting collocation errors in a document, comprising:

accessing a sentence of text in the document, using a processor;
detecting one of a plurality of different checking word types in the sentence of text, the detected checking word type being indicative of a particular collocation error type;
identified the particular collocation error type based on the detected checking word type;
accessing, in a memory, a set of query generation rules to select a set of rules, from a plurality of different sets of rules, for query generation based on the identified particular collocation error type indicated by the checking word type detected;
generating a particular set of queries for the accessed sentence, using the selected set of query generation rules, the particular set of queries including a plurality of queries based on the sentence, each of the plurality of queries including a different set of text extracted from the sentence of text in the document wherein generating a set of queries comprises generating a query template that includes words from the extracted text with a placeholder for the word corresponding to the checking word type, and wherein generating the plurality of queries includes, a sentence query including the sentence without the identified word, a chunk query including a chunk of the sentence without the identified word, and a word query including a pair of words in the sentence without the identified word;
submitting the plurality of queries to a search module that searches a collection of documents to obtain results;
receiving the results from the search module that include text corresponding to text in the plurality of queries wherein the placeholder in the query template is matched by any word;
comparing, in order, beginning with a first of the plurality of queries to a last of the plurality of queries, the text in the queries to the text in the results, only until a match occurs between the text in a query being compared and the text in the results;
if the last of the plurality of queries is compared, without a match occurring, then detecting a collocation error based on the comparison of the text in the queries to the text in the results by identifying portions of the text in the queries that do not match word-for-word, with the text in the results; and
providing an indication of the detected collocation error in the sentence of text and possible corrections for the detected collocation error.

2. The method of claim 1 and further comprising parsing the sentence to identify parts of speech contained therein and wherein generating the plurality of queries is based on the identified parts of speech.

3. The method of claim 1 wherein providing possible corrections comprises presenting candidates of alternative text, that are alternatives to the portion of text in the query that includes the detected collocation error.

4. The method of claim 3 and further comprising ranking the candidates.

5. The method of claim 1 wherein a type of the collocation errors includes at least one of verb-noun, preposition-noun, adjective-noun and verb-adverb.

6. A computer-implemented method of identifying and correcting collocation errors comprising:
accessing, with a processor, a sentence including a word that is identified as creating a given type of collocation error;

identifying query generation rules, in memory, that indicate a set of queries to be generated, based on the given type of collocation error;

generating a query template for each of the set of queries using the identified query generation rules, the set of queries including a plurality of queries including portions of the sentence without the identified word with a placeholder in the template in place of the identified word, wherein generating the plurality of queries includes, a sentence query including the sentence without the identified word, a chunk query including a chunk of the sentence without the identified word, and a word query including a pair of words in the sentence without the identified word;

submitting the plurality of queries to a search module to obtain search results corresponding to the portions of the sentence without the word;

comparing the search results to the plurality of queries wherein the placeholder in the template matches any word in the search results;

identifying at least one candidate replacement word for the identified word in the sentence based on a comparison of the queries with the search results; and providing an indication of the at least one candidate replacement word, for correction of the collocation error.

7. The method of claim 6 and further comprising identifying a list of candidate replacement words and ranking the list.

8. The method of claim 6 wherein the search module is a web based search engine.

9. The method of claim 6 wherein generating a plurality of queries includes generating a template of queries based on the sentence, chunks of the sentence and a pair of words in the sentence.

10. A computer-implemented method of identifying collocation errors in text in a document, the method comprising:

accessing a sentence using a processor;

identifying a word having an error word type in the sentence that is indicative of a given type of collocation error;

parsing the sentence to identify parts of speech contained therein;

applying a set of query generation rules, chosen based on the given type of collocation error, to generate a plurality of queries based on the identified parts of speech, wherein the plurality of queries include a sentence query including the sentence, a chunk query, containing a plurality of words including a chunk of the sentence, and a word query including a pair of words in the sentence, by generating a query template, for each query, that includes words in the sentence adjacent to the error word and a placeholder for the error word;

submitting the query template to a search module to generate search results by searching for text that matches the words in the query template wherein the placeholder is matched by any word;

comparing the plurality of queries, one-by-one, to the search results until text in a query template for a query being compared matches text in the search results;

if the text in the query being compared matches text in the search results, then identifying a word in the search results that matches the placeholder as a replacement word; and outputting an indication that a collocation error exists, of the given collocation error type, and alternative text including the replacement word that likely corrects the collocation error.

11. The method of claim 10 wherein parsing the sentence includes identifying at least one of a verb-noun pair, a preposition-noun pair, an adjective-noun pair and a verb-adverb pair.

12. The method of claim 10 wherein identifying an error word type comprises identifying an error word in the sentence that causes the collocation error.

13. The method of claim 10 and further comprising:

determining a score based on a comparison of at least one of the chunk query and the word query with the search results; and determining whether a collocation error occurs in the sentence based on the score.

* * * * *